Feb. 3, 1942.   W. C. SKAREEN   2,271,846
LEVER CONSTRUCTION
Filed Sept. 20, 1940
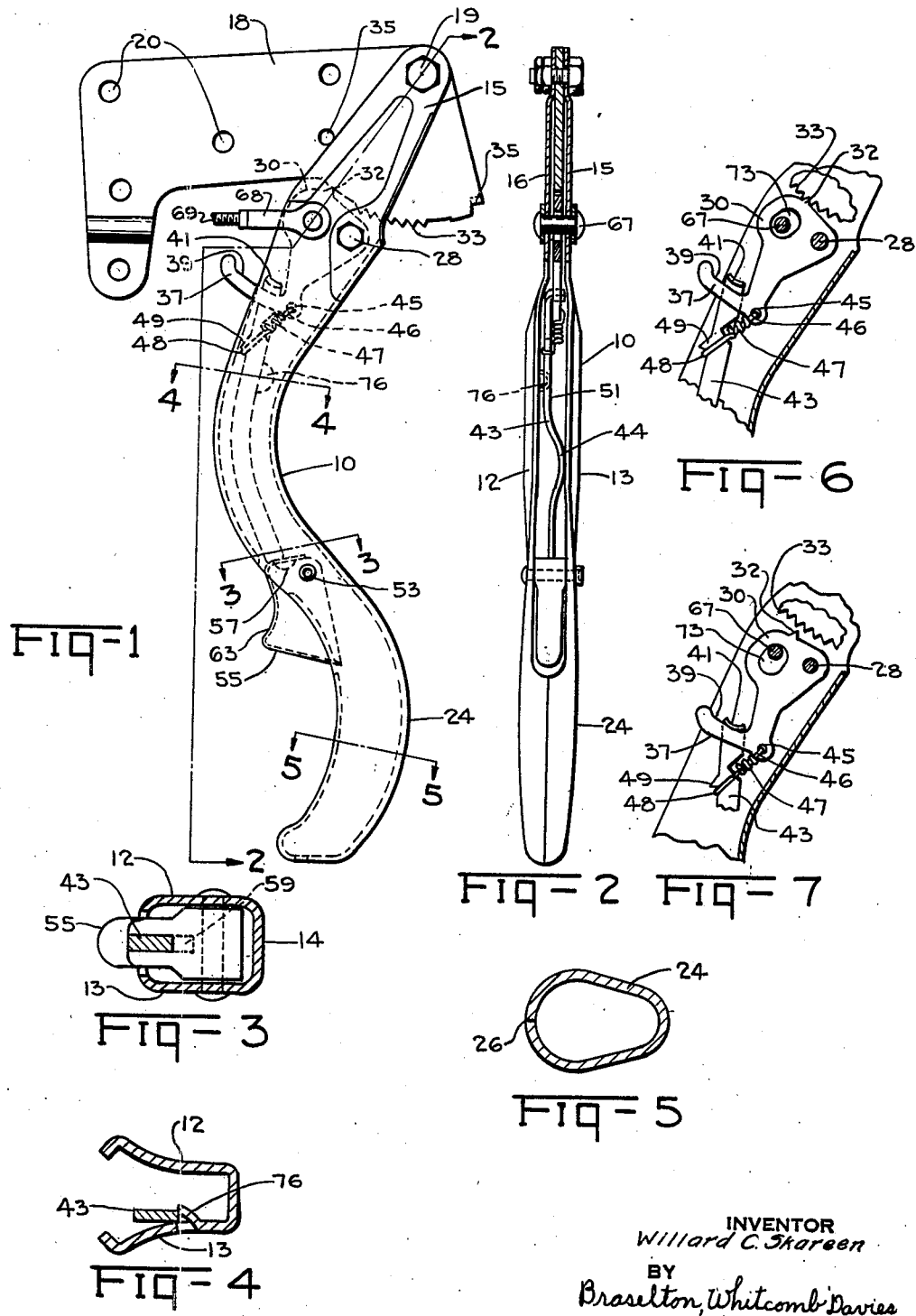
INVENTOR
Willard C. Skareen
BY
Braselton, Whitcomb Davies
ATTORNEY Patented Feb. 3, 1942

2,271,846

UNITED STATES PATENT OFFICE 2,271,846

LEVER CONSTRUCTION

Willard C. Skareen, Toledo, Ohio, assignor to The Bingham Stamping Company, Toledo, Ohio, a corporation of Ohio Application September 20, 1940, Serial No. 357,624

6 Claims. (Cl. 74—537)

This invention relates to mechanism actuators or controls, and more particularly to a lever construction especially adapted for controlling the operation of vehicle braking mechanisms.

The invention includes as one of its principal objects the provisions of a novel means for connecting the pawl and pawl actuating means of a brake lever.

The invention contemplates a brake lever construction including a novel arrangement wherein the lever holding means and its actuating mechanism is maintained in one position by a single means.

The invention includes a novel lever arrangement occupying very small space adapted to be mounted to one side on the driver's compartment on or adjacent to the dash board providing greater ease in the control of the vehicle affording greater leg room to the driver, without interfering with the comfort of persons entering or leaving the front seat of the vehicle.

The invention includes as one of its objects the provision of resilient means interconnecting lever clutching means and the clutch releasing mechanism whereby the former is normally urged into clutching engagement and its releasing mechanism is normally held in one position.

The invention includes as another of its objects the provision of a resilient and positive connection between the clutch element and its operating means so that the clutch element is normally urged into engagement with its clutching surface by the resilient means and out of engagement by the establishment of the positive connection.

The invention includes as another of its objects the provision of a resilient and positive connection between the clutch element and its operating means so that the clutch element is normally urged into engagement with its clutching surface without a positive contacting engagement with its operating means whereby a relatively light spring is utilized in urging and retaining the clutch element in clutching engagement.

Another object of the present invention is to improve brake lever constructions whereby manufacturing costs may be reduced to a minimum for quantity production, and which is so designed and constructed as to be highly efficient in service without sacrificing any of its positive holding features.

A further object of the present invention is to provide a novel spring arrangement which normally maintains the cooperating clutching elements of a lever clutch in latched position.

Still another object of the present invention is to form an element of the clutch actuating means whereby it will be held under its inherent stress in contact with a wall of the lever body serving as an anti-rattling means for the movable elements of the construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which Figure 1 is a side elevational view of a brake lever incorporating the principles of the invention;

Figure 2 is a front elevational view of a portion of the lever arrangement shown in Figure 1;

Figure 3 is an enlarged transverse sectional view taken substantially on the line 3—3 of Figure 1;

Figure 4 is an enlarged fragmentary sectional view taken substantially on the line 4—4 of Figure 1;

Figure 5 is an enlarged sectional view taken on the line 5—5 of Figure 1;

Figure 6 is an enlarged detail sectional view of the clutch arrangement of the invention showing the same in clutch engaging position;

Figure 7 is a view of the clutch arrangement similar to Figure 6 showing the clutch in released position.

Referring to the drawing in detail the emergency brake lever illustrated is generally of the stamped metal type or formed of sheet metal or other suitable material having its main body portion 10 preferably of a U-shaped configuration throughout the greater portion of its length including side walls 12 and 13 and a bight portion 14. As particularly shown in Figures 1 and 2 the body 10 of the lever terminates at its upper end into spaced projecting sections forming substantially parallel end portions 15 and 16. The portions 15 and 16 are adapted to straddle a supporter bracket 18 to which the lever member is pivotally secured by means of a bolt 19 received in aligned openings provided in portions 15 and 16 in conjunction with an opening provided in the bracket 18. The bracket 18 may be secured in a suitable operating position in an automotive vehicle as for example adjacent the dashboard (not shown) and is provided with openings 20 to receive proper fastening means.

The U-shaped portion of the lever 10 terminates at its lower end in a suitably formed handle or grip portion 24 formed in cross section as particularly shown in Figure 5 with the edge portions thereof abutting to form a seam 26. If desired the abutting edges of the handle portion may be welded to form a more unitary construction but it has been found that the inherent stress of the formed metal is ordinarily sufficient to cause the abutting edges to remain in fixed relation.

The side walls 12 and 13 of the lever beneath the projecting portions 15 and 16 are provided with aligned openings to receive a suitable stub shaft or pin 28 for pivotally supporting a pawl or clutch member 30 positioned intermediate the walls 12 and 13. The pawl is provided at its upper portion with a projection or pawl tooth 32 adapted to cooperate with a serrated or clutch surface 33 formed on an edge of the bracket 18, the bracket being further provided with a pair of struck up projections or stops 35 protruding on one side thereof to limit the movement of lever 10 in both directions.

The pawl or clutch member 30 is formed with an extended lower portion 37 of hook-like configuration providing a ledge 39 adapted to be engaged by lateral projection 41 formed on the upper extremity of a bar or pawl operating rod 43. The pawl 30 is further provided adjacent the inner lower extremity thereof with a spring retaining or anchoring means such as an opening 45 adapted to receive one end 46 of a resilient member or retractile coil spring 47. The other end 48 of spring 47 is adapted to embrace the pawl operating rod 43 adjacent to its lateral projection 41 and is held in place by means of a stop 49 formed on the bar 43 and as particularly shown in Figures 6 and 7 which serve to prevent longitudinal displacement of the spring with respect therewith. Rod 43 is offset as at 51 in order that the upper portion of the rod 43 may pass the pawl 30 as particularly shown in Figure 2.

Positioned in aligned openings adjacent the upper part of the handle portion 24 is a pin 53 which extends through the walls 12 and 13 of the lever 10 and is held therein by means of its headed portions on the exterior surfaces of the lever side walls. The pin 53 serves to pivotally support a finger piece or trigger 55 positioned between the lever walls and preferably formed of sheet metal into hollow or cup-like configuration. The finger trigger is provided with an opening in the upper portion thereof to receive the hook-like lower extremity 57 of rod 43, the hook being of such configuration as to permit the pivotal movement of trigger 55 and is further provided with a ledge portion 59 as shown in Figure 3 which serves to normally prevent disengagement of the rod and finger trigger.

It is to be noted that the spring 47 provides a resilient or what may be termed initial connection between the clutch element or pawl 30 and its operating or clutch releasing means performing several concurrent functions, it serves first as means to urge the clutch element of pawl 30 into clutching engagement with the toothed section 33 of the stationary support or bracket 18, also as means for holding the laterally extending portion 41 of rod 43 out of engagement with the clutch member 30 and as means to hold the finger trigger 55 to its outermost position. Due to the spring 47 which continuously urges the trigger 55 outwardly releasing the rod 43 from close engagement with the ledge 39, thus providing a slight "lost motion" connection between the pawl and the releasing rod.

In order to facilitate ease of manufacture and assembly the particular arrangement of the elements provide that the rod 43 is free from positive engagement with the pawl 30 and therefore affords easy assembly of the pawl and rod within the lever. The action of the pawl and releasing mechanism is enhanced by the use of a single spring means for the pawl as the latter may pass over the teeth of the clutch surface without affecting the releasing mechanism reducing the wear and the production of noise. Thus, when the trigger 55 is in its normal position the rod 43 is out of direct engagement with the pawl 30 and spring 47 is free to urge the pawl into engagement with the clutch teeth 32 as shown in Figure 6. However, when the rod 43 engages with the ledge 39 of pawl 30 by movement of the finger trigger forcing the pawl downwardly as shown in Figure 7 thereby releasing the pawl from engagement with the teeth 32, thus permitting the lever to be moved to brake releasing position.

The brake mechanism of the vehicle may be connected to the lever 10 through the medium of a clevis 68 and cable 69 or other suitable actuating means, the side walls of lever 10 having aligned openings to receive a pin 67 passing through the extremity of the clevis 68. The pawl 30 in this form of the invention is provided with an enlarged opening 73 to accommodate the clevis pin and permit the pawl to oscillate about the axis of its support 28 without interference from the clevis connection as when the pawl is out of engagement with the clutch, as shown in Figure 7, the opening is sufficiently large to permit such movement of the pawl.

It is to be noted that the pawl actuating rod 43 is provided with a raised or curved portion 44, the convexity of which is in frictional contact with the inner wall 13 of the lever body which serves to resiliently eliminate lateral movement of the rod or bar 43 and thus prevent rattling of the parts or elements making up the clutch and clutch releasing means. It is also to be noted that side wall 12 of the lever body is provided with a struck up inwardly extending portion 76 which serves as a rest or guide for the clutch actuating bar 43, the bar being held in contact at all times with the guide 76 under the influence of spring 47.

In the operation of the arrangement of the invention with the parts shown in brake setting position as in Figure 1, the braking mechanism may be released by the operator by the placing of the index or other finger upon face 63 of the trigger and depressing the same. This causes pivotal movement of the trigger about the pin 53 and draws the rod 43 downwardly to engage the pawl 30 moving the latter to effect a release of the tooth 32 from engagement with the serrated portion 33. The lever may be then swung clockwise to brake releasing position. It is to be noted that in order to effect actuation of the brakes it is only necessary to grasp the handle 24 of the lever and move same in a counter-clockwise direction about the shaft 19 as the pawl will at all times be urged toward clutching position under the influence of spring 47 which serves to retain the pawl 30 in engagement with the serrated portion of the support at all times when the trigger is released.

It is apparent that, within the scope of the invention, modifications and different arrangements may be made other than is herein disclosed, and the present disclosure is illustrative merely, the invention comprehending all variations thereof.

What I claim is:

1. In combination, mechanism control including a support having a toothed surface; a lever formed of sheet metal having at one end parallel side wall portions straddling and pivotally connected to said support and terminating at its other end in a hand grip portion; a pawl pivoted to said lever; a finger trigger formed of sheet metal pivoted to said lever adjacent the grip portion; a rod having one end connected to said finger trigger and having a laterally extending portion at its other end normally spaced from said pawl but arranged to withdraw said pawl from engagement with the toothed surface upon movement of said finger trigger toward the grip portion of said lever; and a coil spring connecting said rod and said pawl for holding the pawl into engagement with the toothed surface of said support and holding the laterally extending portion of said rod out of engagement with said pawl.

2. In combination, mechanism control including a support having a toothed surface; a lever formed of sheet metal having at one end parallel side wall portions straddling and pivotally connected to said support and terminating at its other end into a grip portion; a pawl pivoted to said lever member; a finger trigger pivoted to said lever member adjacent the grip portion; a rod connected to said finger trigger and having its end terminating adjacent to but normally out of engagement with said pawl; and spring means connecting said pawl and said rod.

3. In combination, mechanism control including a support having a toothed surface; a lever formed of sheet metal having one end pivotally connected to said support and terminating at its other end into a grip portion; a pawl pivoted to said lever member; a finger piece pivoted to said lever member adjacent the grip portion; a rod connected to said finger trigger and having its end terminating adjacent to but normally out of engagement with said pawl; and single resilient means for concurrently urging said pawl into engagement with the toothed surface of said support and said finger piece to its outermost position.

4. In combination, mechanism control including a support having a clutching surface; a lever formed of sheet metal having one end pivotally connected to said support and terminating at its other end in a grip portion; a clutch element pivoted to said lever member and adapted to engage the clutching surface of said support; a finger trigger pivoted to said lever member between the side walls thereof and adjacent the grip portion; a bar connected to said finger trigger at one end and having a projection at its other end arranged adjacent to but normally out of engagement with said clutch element, said projection being arranged whereby actuation of said finger trigger moves said projection into engagement with the clutch element; and a spring for normally maintaining said clutch element in engagement with said clutching surface and simultaneously urging said bar out of engagement with said clutch element.

5. In combination a mechanism control including a support having a clutching surface; a lever member formed of sheet metal and having a portion pivotally connected to said support, said lever member having a body portion terminating at its lower extremity in a handle portion; a clutch member articulated with said lever and adapted for engagement with the clutching surface on said support; a bar adapted for cooperation with said clutch member, means adjacent the handle portion for actuating said bar; said bar having a portion formed laterally in frictional engagement with an inner wall of said lever body; and spring means cooperating with said bar and said clutch means for normally urging said bar out of engagement with said clutch means.

6. In combination a mechanism control including a support having a clutching surface; a lever member formed of sheet metal and having a portion pivotally connected to said support, said lever member having a body portion terminating at its lower extremity in a handle portion; a clutch member articulated with said lever and adapted for engagement with the clutching surface on said support; a finger-piece formed of sheet metal pivoted to said lever adjacent the handle portion; a bar connected with said finger-piece and having a portion adapted for cooperation with said clutch member, guiding means for said bar comprising an inwardly extending projection formed on a side wall of the body portion of the lever member; said bar having a portion formed laterally in frictional engagement with one of the inner walls of said lever body; and spring means cooperating with said bar and said clutch means for normally urging said bar out of engagement with said clutch means.

WILLARD C. SKAREEN.